US012686447B2

(12) United States Patent
Tai

(10) Patent No.: US 12,686,447 B2
(45) Date of Patent: Jul. 21, 2026

(54) FRONT AERODYNAMIC STRUCTURE FOR VEHICLE

(71) Applicant: FOXTRON VEHICLE TECHNOLOGIES CO., LTD., New Taipei City (TW)

(72) Inventor: Chia-Hui Tai, New Taipei City (TW)

(73) Assignee: FOXTRON VEHICLE TECHNOLOGIES CO., LTD., New Taipei City (TW)

( * ) Notice: Subject to any disclaimer, the term of this patent is extended or adjusted under 35 U.S.C. 154(b) by 335 days.

(21) Appl. No.: 18/399,645

(22) Filed: Dec. 28, 2023

(65) Prior Publication Data

US 2025/0121892 A1      Apr. 17, 2025

(30) Foreign Application Priority Data

Oct. 13, 2023    (TW) ................................. 112211045

(51) Int. Cl.
*B62D 35/00*          (2006.01)
(52) U.S. Cl.
CPC .................................. *B62D 35/005* (2013.01)
(58) Field of Classification Search
CPC .................................................... B62D 35/005
See application file for complete search history.

(56) References Cited

U.S. PATENT DOCUMENTS

| | | | | | |
|---|---|---|---|---|---|
| 3,214,215 | A | * | 10/1965 | Hansen .................. | B60J 1/2005 296/91 |
| 4,379,582 | A | * | 4/1983 | Miwa ................... | B62D 35/007 296/180.5 |
| 10,577,034 | B2 | * | 3/2020 | Thompson ........... | B60K 11/085 |
| 10,906,597 | B2 | * | 2/2021 | Biancalana .......... | B62D 35/005 |
| 11,299,218 | B2 | * | 4/2022 | Gaylard ............... | B62D 25/105 |
| 11,352,076 | B2 | * | 6/2022 | Kay ..................... | B62D 35/005 |
| 12,503,176 | B2 | * | 12/2025 | Raul .................... | B62D 35/005 |
| 2018/0229780 | A1 | * | 8/2018 | Thompson ............ | B62D 37/02 |
| 2019/0233022 | A1 | * | 8/2019 | Biancalana ........... | B62D 25/12 |
| 2024/0149955 | A1 | * | 5/2024 | Antonelli ............. | B62D 25/105 |
| 2025/0052224 | A1 | * | 2/2025 | Colletta ............... | B60R 16/033 |

FOREIGN PATENT DOCUMENTS

| | | | | | |
|---|---|---|---|---|---|
| GB | 2607059 | A | * | 11/2022 | ............. B60K 11/08 |
| JP | 2003034271 | A | * | 2/2003 | |

* cited by examiner

*Primary Examiner* — Faye M Fleming
(74) *Attorney, Agent, or Firm* — Li & Cai Intellectual Property Office

(57) ABSTRACT

A front aerodynamic structure for vehicle includes an airflow inlet, an airflow outlet, and an acceleration aerodynamic channel. The airflow inlet is formed on a front portion of a vehicle. The airflow outlet is formed on a hood of the vehicle. The acceleration aerodynamic channel is disposed in the vehicle and the airflow inlet is connected to the airflow outlet through the acceleration aerodynamic channel. The airflow inlet is configured to guide an airflow into the front portion of the vehicle and allow the airflow to enter the acceleration aerodynamic channel. The acceleration aerodynamic channel is configured to accelerate the airflow to pass through the vehicle. The airflow outlet is configured to guide the airflow in the acceleration aerodynamic channel away from the vehicle.

7 Claims, 4 Drawing Sheets

FRONT AERODYNAMIC STRUCTURE FOR VEHICLE

CROSS-REFERENCE TO RELATED PATENT APPLICATION

This application claims the benefit of priority to Taiwan Patent Application No. 112211045, filed on Oct. 13, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a structure that changes vehicle aerodynamics, and more particularly to a front aerodynamic structure for a vehicle.

BACKGROUND OF THE DISCLOSURE

When a vehicle travels at a high speed, aerodynamic resistance (wind resistance) becomes the primary external resistance. Moreover, as the speed of the vehicle increases, the wind resistance will increasingly affect the energy consumption, fuel consumption, and/or cruising range of the vehicle.

Therefore, how to improve the aerodynamic performance of the vehicle through improvements in structural design to reduce the resistance when the vehicle is being driven, improve the performance of the vehicle, and achieve energy-saving, and achieve better mileage so as to overcome the aforementioned shortcomings, has become an important issue to be addressed in the relevant field.

SUMMARY OF THE DISCLOSURE

In response to the above-referenced technical inadequacies, the present disclosure provides a front aerodynamic structure for a vehicle. The front aerodynamic structure can reduce the driving resistance when the vehicle is being driven. The front aerodynamic structure can also change the surface pressure distribution of the vehicle, thereby reducing the air resistance when the vehicle is being driven (traveling), and bringing energy-saving effects to the vehicle to achieve a better cruising mileage.

In order to solve the above-mentioned problems, one of the technical aspects adopted by the present disclosure is to provide a front aerodynamic structure for vehicle. The front aerodynamic structure for vehicle includes an airflow inlet, an airflow outlet, and an acceleration aerodynamic channel. The airflow inlet is formed on a front portion of a vehicle. The airflow outlet is formed on a hood of the vehicle. The acceleration aerodynamic channel is disposed in the vehicle. The airflow inlet is connected to the airflow outlet through the acceleration aerodynamic channel. The airflow inlet is configured to guide an airflow into the front portion of the vehicle and allow the airflow to enter the acceleration aerodynamic channel. The acceleration aerodynamic channel is configured to accelerate the airflow to pass through the vehicle. The airflow outlet is configured to guide the airflow in the acceleration aerodynamic channel away from the vehicle, so as to reduce an airflow resistance when the vehicle is in a driving state.

In one of the possible or preferred embodiments, a ratio of an outlet cross-sectional area of the airflow outlet to an inlet cross-sectional area of the airflow inlet ranges from 1:1 to 1:1.3.

In one of the possible or preferred embodiments, the acceleration aerodynamic channel has a narrow portion located in the middle of the acceleration aerodynamic channel, and a ratio of an inlet cross-sectional area of the airflow inlet to a pipe cross-sectional area of the narrow portion ranges from 1:0.9 to 1:0.95.

In one of the possible or preferred embodiments, the acceleration aerodynamic channel has a first section, a second section and a third section. One end of the first section is connected to the airflow inlet, another end of the first section is connected to one end of the second section, and another end of the second section is connected to one end of the third section, and another end of the third section is connected to the airflow outlet. Based on a ground plane on which the vehicle travels, the first section, the second section and the third section have different inclination angles.

In one of the possible or preferred embodiments, based on the ground plane on which the vehicle travels, the first section has an inclination angle ranging from 0 degrees to 6 degrees, the second section has an inclination angle ranging from 70 degrees to 90 degrees, and the third section has an inclination angle ranging from 10 degrees to 40 degrees. In addition, the inclination angles are the angles of the axis of each section of the acceleration aerodynamic channel relative to the ground plane.

In one of the possible or preferred embodiments, the acceleration aerodynamic channel has a narrow portion located in the middle of the acceleration aerodynamic channel, and a ratio of an inlet cross-sectional area of the airflow inlet to a pipe cross-sectional area of the narrow portion ranges from 1:0.9 to 1:0.95.

In one of the possible or preferred embodiments, the third section of the acceleration aerodynamic channel has an upper part and a lower part. In addition, the upper part is disposed at the hood of the vehicle, and the upper part and the lower part are detachably assembled and matched to form the third section and the airflow outlet.

In one of the possible or preferred embodiments, the vehicle is an electric vehicle.

Therefore, in the front aerodynamic structure for vehicle provided by the present disclosure, by virtue of "the acceleration aerodynamic channel being configured to accelerate the airflow to pass through the vehicle," and "the airflow outlet being configured to guide the airflow in the acceleration aerodynamic channel away from the vehicle, so as to reduce an airflow resistance when the vehicle is in a driving state," the driving resistance is reduced, the surface pressure distribution of the vehicle is changed, thereby reducing the air resistance when the vehicle is being driven, and bringing energy-saving effects to the vehicle to achieve a better cruising mileage.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
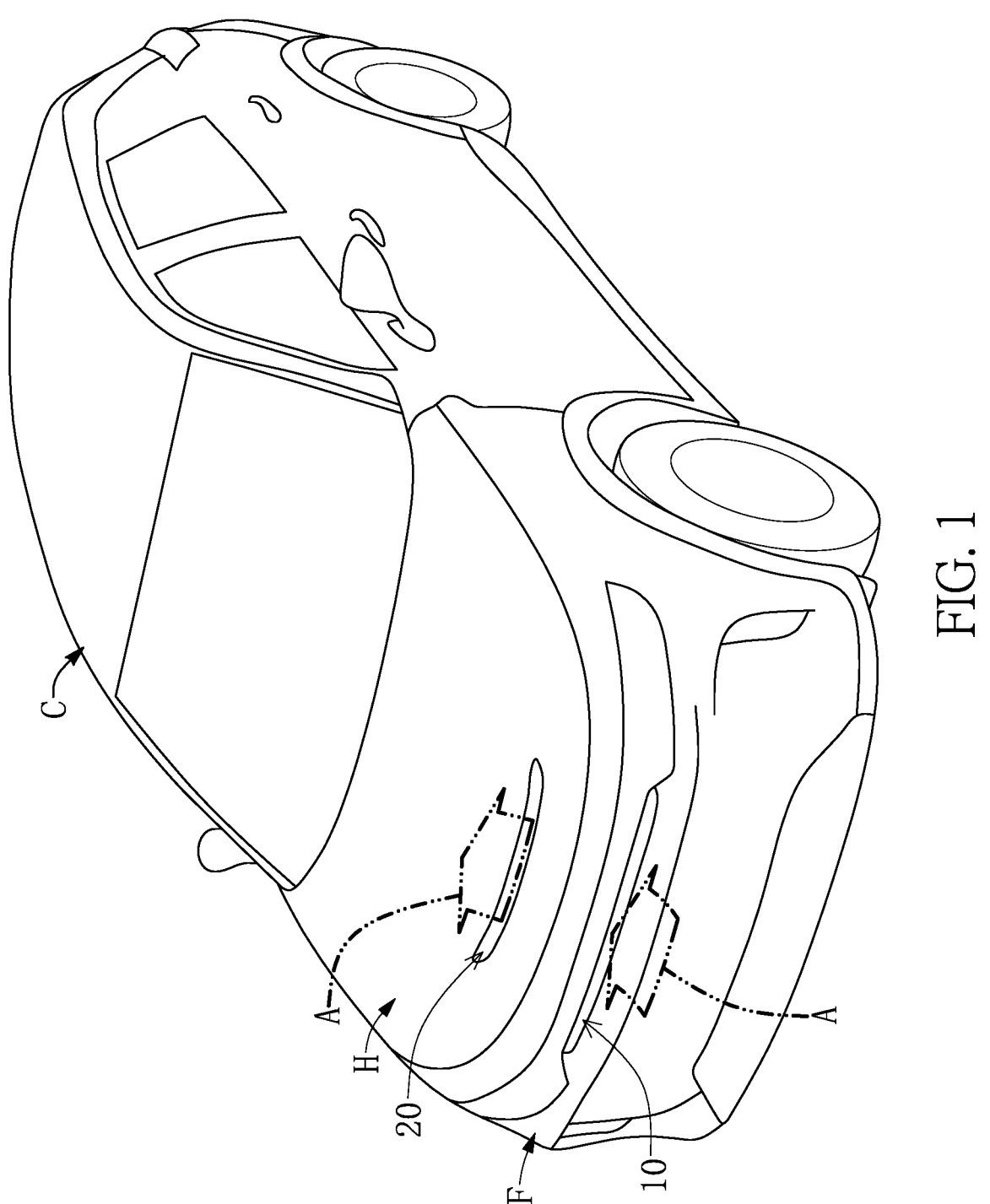
FIG. 1 is a schematic perspective view of a vehicle according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Embodiment

Figure 2:
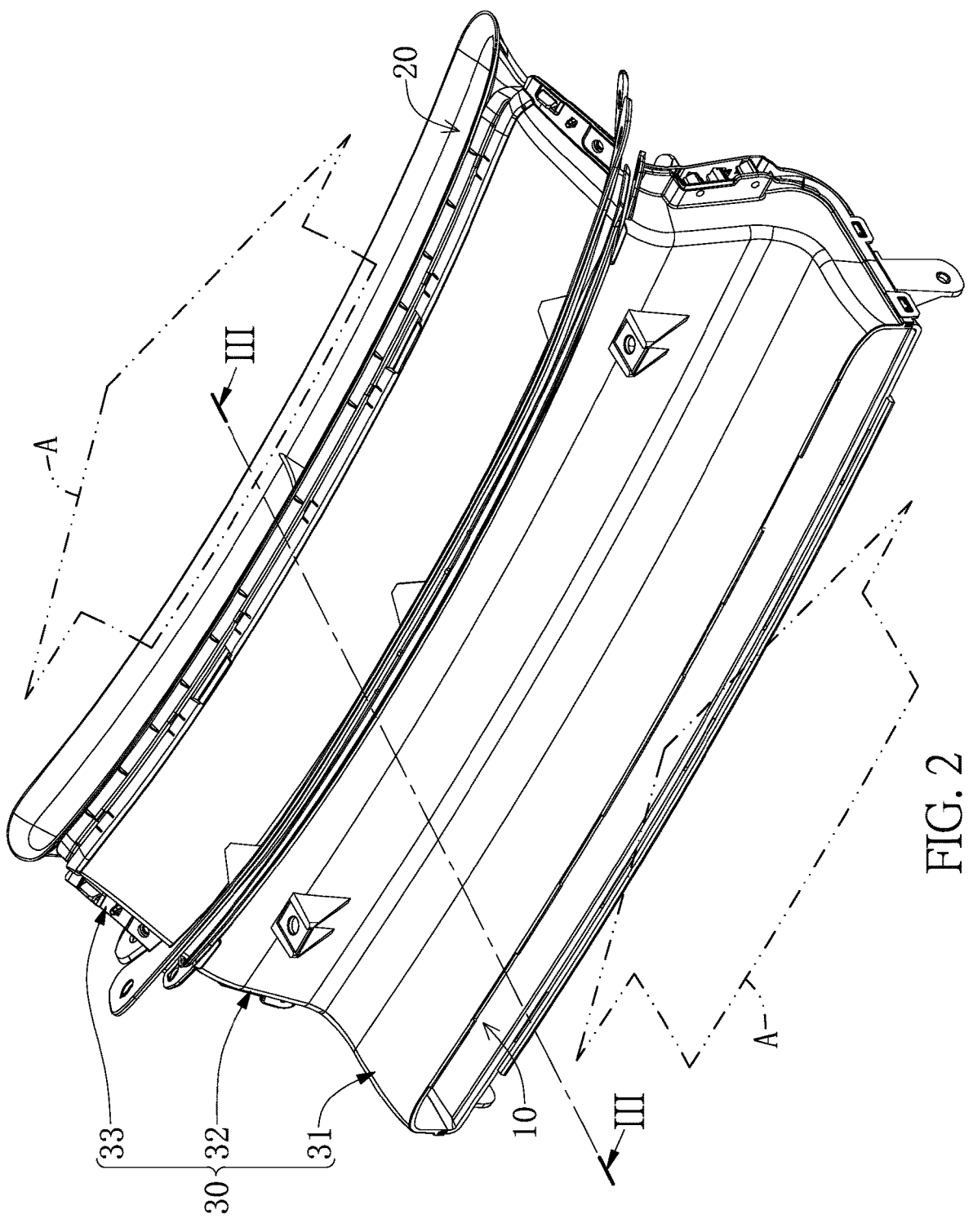
FIG. 2 is a schematic perspective view of an acceleration aerodynamic channel for the vehicle according to the embodiment of the present disclosure.

Referring to FIG. 1 and FIG. 2, an embodiment of the present disclosure provides a front aerodynamic structure for a vehicle C. The front aerodynamic structure includes an airflow inlet 10, an airflow outlet 20, and an acceleration aerodynamic channel 30. Referring to FIG. 1, which is to be read in conjunction with FIG. 3 and FIG. 4, a front portion F and a hood H of the vehicle C are shown in a cross-sectional view, and the vehicle C can be an electric vehicle. The airflow inlet 10 of the front aerodynamic structure is formed on the front portion F of the vehicle C, and the airflow outlet 20 of the front aerodynamic structure is formed on the hood H of the vehicle C. The acceleration aerodynamic channel 30 is disposed in the vehicle C, and the airflow inlet 10 is connected to the airflow outlet 20 through the acceleration aerodynamic channel 30.

The airflow inlet 10 can be located at the upper half of the front portion F of the vehicle C, or can be located above an air intake grille of the vehicle C. Specifically, the airflow inlet 10 allows an airflow A from outside the vehicle to be guided into the acceleration aerodynamic channel 30. That is, the airflow inlet 10 is configured to guide the airflow A into the front portion F of the vehicle C, and after passing through the acceleration aerodynamic channel 30, the airflow A leaves the acceleration aerodynamic channel 30 through the airflow outlet 20. In other words, the acceleration aerodynamic channel 30 is configured to accelerate the airflow A to pass through the vehicle C, and the airflow outlet 20 is configured to guide the airflow A in the acceleration aerodynamic channel 30 away from the vehicle C, so as to reduce an airflow resistance when the vehicle C is in a driving state.

In order to achieve the effect of converting airflow resistance into a force for driving the vehicle, the structural design of the acceleration aerodynamic channel 30 is crucial. The acceleration aerodynamic channel 30 of the present disclosure is designed to have multiple sections in different pipe diameters and different inclination angles. The cross-sectional view shows a three-section curved pipe having different pipe diameters that are different in width. Furthermore, referring to FIG. 3, the acceleration aerodynamic channel 30 has a first section 31, a second section 32, and a third section 33. One end of the first section 31 is connected to the airflow inlet 10, another end of the first section 31 is connected to one end of the second section 32, and another end of the second section 32 is connected to one end of the third section 33, and another end of the third section 33 is connected to the airflow outlet 20. That is to say, the first section 31, the second section 32, and the third section 33 are connected to form the acceleration aerodynamic channel 30 that is connected between the airflow inlet 10 and the airflow outlet 20.

Figure 3:
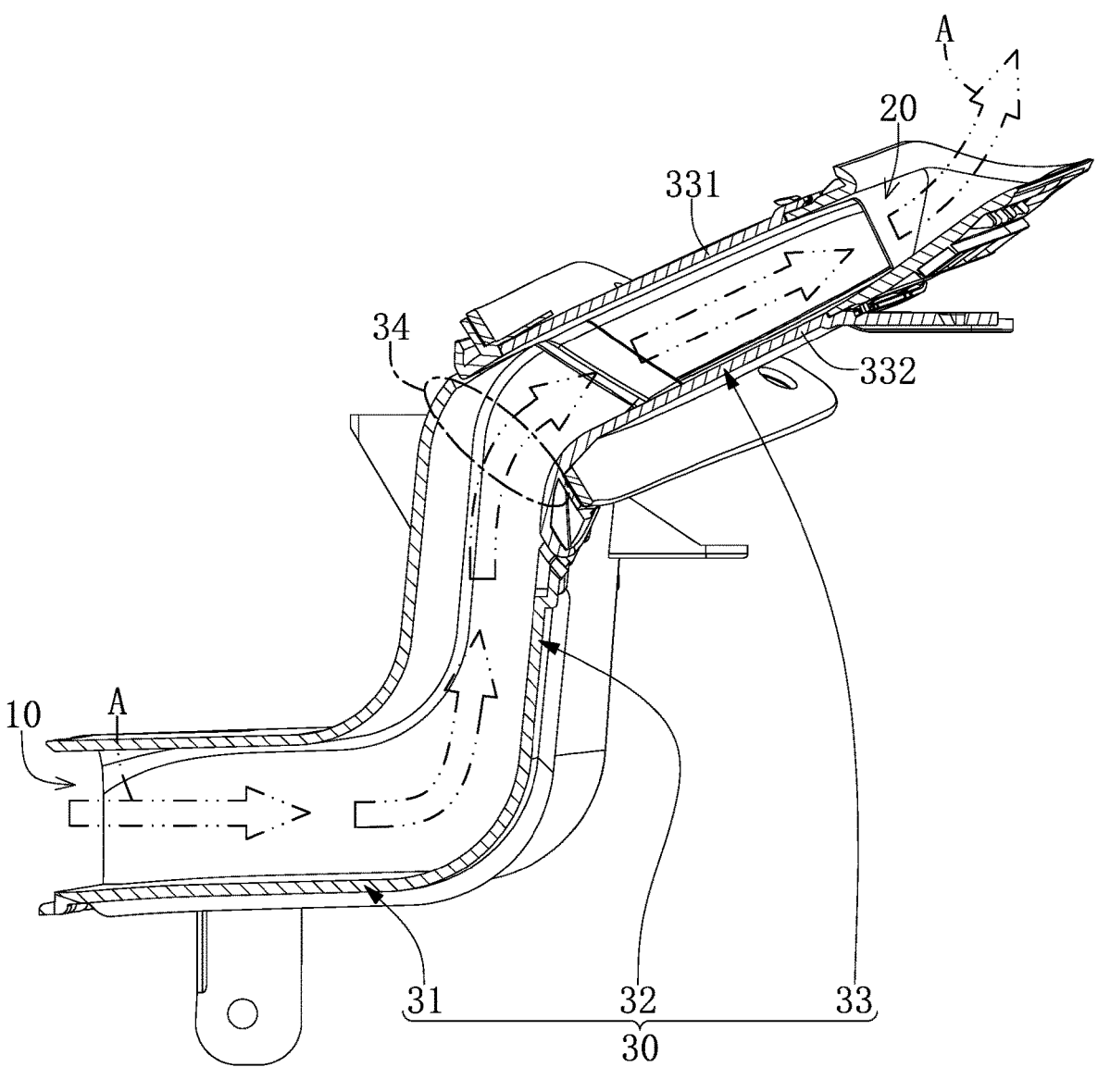
FIG. 3 is a schematic cross-sectional view taken along line III-III of FIG. 2.
Figure 4:
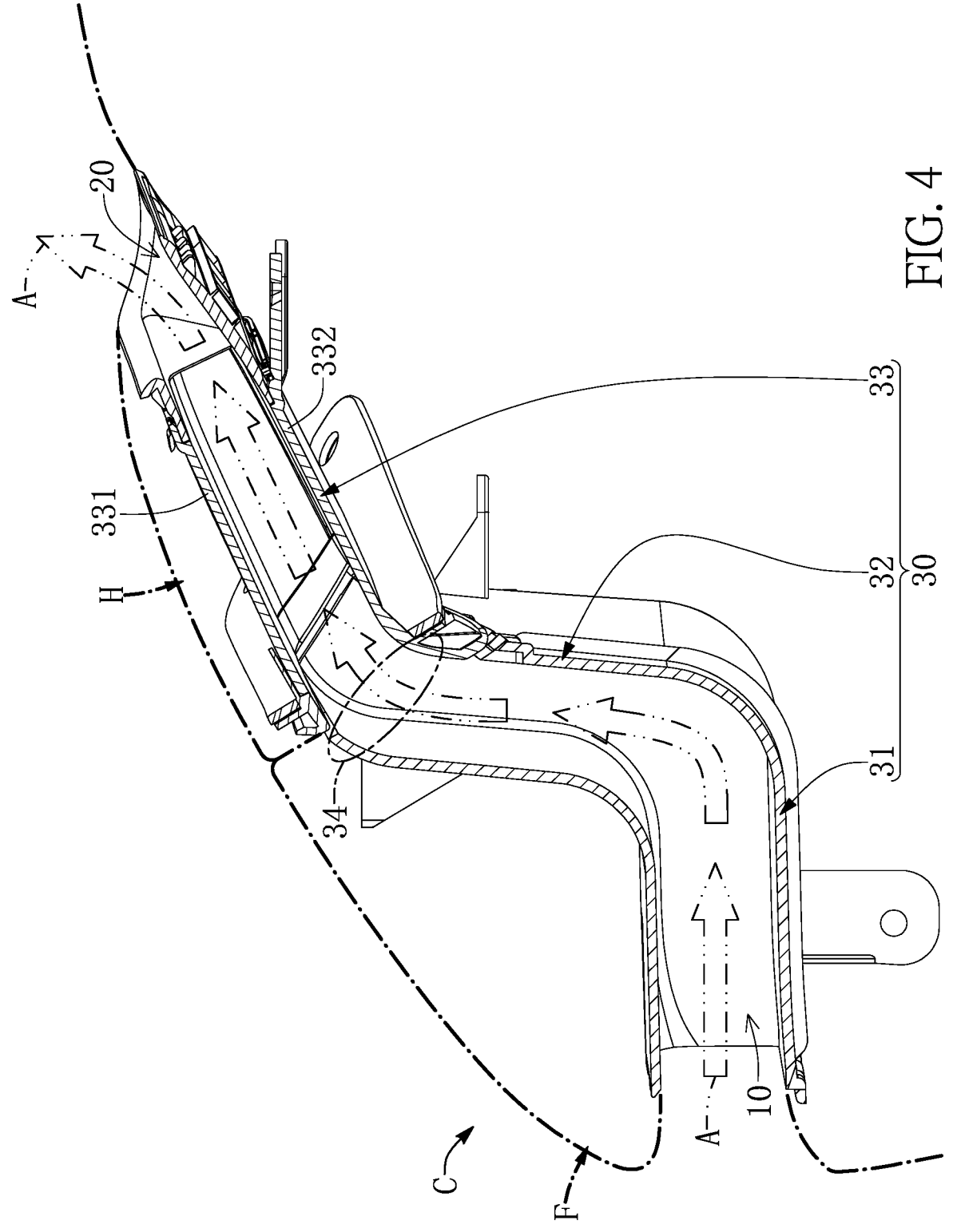
FIG. 4 is a schematic partially enlarged view of the acceleration aerodynamic channel in the vehicle according to the embodiment of the present disclosure.

Referring to the cross-sectional view as shown in FIG. 3 and FIG. 4, the first section 31, the second section 32, and the third section 33 of the acceleration aerodynamic channel 30 respectively have different inclination angles. In other words, the inclination angles are the angles of the axes of each section of the acceleration aerodynamic channel 30 relative to the ground. Based on the ground plane where the vehicle C is located (or is traveling) being 0 degrees, the inclination angle of the first section 31 can range from 0 degrees to 6 degrees (preferably ranges from 0 degrees to 4 degrees, and more preferably is 3 degrees). That is to say, the first section 31 is substantially parallel to the ground plane where the vehicle C is located. In practice, the airflow A directly passes through the airflow inlet 10 and enters the first section 31 of the acceleration aerodynamic channel 30 in a direction parallel to the ground plane.

Next, based on the ground plane where the vehicle C is located, the inclination angle of the second section 32 can range from 70 degrees to 90 degrees (preferably ranges from 75 degrees to 85 degrees, and more preferably is 80 degrees). That is to say, the pipe of the second section 32 can be substantially perpendicular to the ground plane. In practice, the airflow A climbs in the second section 32 in a direction substantially perpendicular to the ground plane to generate a pressure difference, thereby accelerating the speed of the airflow A.

Lastly, based on the ground plane where the vehicle C is located, the inclination angle of the third section 33 can range from 10 degrees to 40 degrees (preferably ranges from 15 degrees to 35 degrees, and more preferably is 30 degrees). It should be noted that the another end of the third section is connected to the airflow outlet 20 of the hood H of the vehicle C. Therefore, the inclination angle of the third section 33 can be adjusted according to an angle of a curve close to the hood H. In practice, the airflow A can pass through the third section 33 at an angle close to the hood H, and leave the acceleration aerodynamic channel 30 from the airflow outlet 20 along the hood H at an accelerated rate.

For instance, in order to more effectively create a pressure difference in the airflow A entering the acceleration aerodynamic channel 30 to produce an acceleration effect (the Venturi effect) in the airflow A, the acceleration aerodynamic channel 30 can further include a narrow portion 34. The narrow portion 34 is located in the middle of the acceleration aerodynamic channel 30 and is the position having the smallest cross-sectional area of the pipe in the acceleration aerodynamic channel 30. More specifically, the narrow portion 34 can be located at a position where the second section 32 and the third section 33 of the acceleration aerodynamic channel 30 are connected. Furthermore, the pipe cross-sectional area of the narrow portion 34 is smaller than an inlet cross-sectional area of the airflow inlet 10 and an outlet cross-sectional area of the airflow outlet 20. For instance, the ratio of the inlet cross-sectional area of the airflow inlet 10 to the pipe cross-sectional area of the narrow portion 34 can be between 1:0.9 and 1:0.95, and is preferably 1:0.93. However, the aforementioned details are disclosed for exemplary purposes only, and are not meant to limit the scope of the present disclosure.

For instance, a ratio of the outlet cross-sectional area of the airflow outlet 20 to the inlet cross-sectional area of the airflow inlet 10 ranges from 1:1 to 1:1.3, and is preferably 1:1.25. That is to say, in this embodiment, the airflow inlet 10 is slightly larger in size than the airflow outlet 20. However, the aforementioned details are not meant to limit the scope of the present disclosure.

Referring to FIG. 4, the first section 31 and the second section 32 of the acceleration aerodynamic channel 30 can be integrally formed and connected to each other, and are disposed in the front portion F of the vehicle C. The third section 33 of the acceleration aerodynamic channel 30 has an upper part 331 and a lower part 332. In addition, the upper part 331 is disposed at the hood H of the vehicle C, the lower part 332 can be connected to the second section 32 and disposed in the front portion F of the vehicle C. The upper part 331 and the lower part 332 are detachably assembled and matched to form the third section 33 and the airflow outlet 20. That is to say, an outer edge of the lower part 332 corresponds to an opening on the hood H of the vehicle C, and the opening corresponds to the airflow outlet 20. However, the aforementioned examples are not meant to limit the scope of the present disclosure.

Beneficial Effects of the Embodiment

In conclusion, in the front aerodynamic structure for vehicle provided by the present disclosure, by virtue of "the acceleration aerodynamic channel being configured to accelerate the airflow to pass through the vehicle," and "the airflow outlet being configured to guide the airflow in the acceleration aerodynamic channel away from the vehicle, so as to reduce an airflow resistance when the vehicle is in a driving state," the driving resistance is reduced, the surface pressure distribution of the vehicle is changed, thereby reducing the air resistance when the vehicle is being driven, and bringing energy-saving effects to the vehicle to achieve a better cruising mileage.

Furthermore, a speed of the airflow is accelerated after passing through the three-section curved acceleration aerodynamic channel, and the airflow will be directed out from the hood. The speed of the airflow is optimized to be accelerated to 2 to 3 times the vehicle speed to effectively reduce the resistance at the front portion of the vehicle and the front portion of the middle of the vehicle (e.g., windshield), and increase the thrust at the rear of the vehicle.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A front aerodynamic structure for vehicle, comprising:
an airflow inlet formed on a front portion of a vehicle;
an airflow outlet formed on a hood of the vehicle; and
an acceleration aerodynamic channel disposed in the vehicle, wherein the airflow inlet is connected to the airflow outlet through the acceleration aerodynamic channel;
wherein the airflow inlet is configured to guide an airflow into the front portion of the vehicle and allow the airflow to enter the acceleration aerodynamic channel;
wherein the acceleration aerodynamic channel is configured to accelerate the airflow to pass through the vehicle;
wherein the airflow outlet is configured to guide the airflow in the acceleration aerodynamic channel away from the vehicle, so as to reduce an airflow resistance when the vehicle is in a driving state;
wherein the acceleration aerodynamic channel has a first section, a second section, and a third section;
wherein one end of the first section is connected to the airflow inlet, another end of the first section is connected to one end of the second section, another end of the second section is connected to one end of the third section, and another end of the third section is connected to the airflow outlet; and
wherein, based on a ground plane on which the vehicle travels, the first section, the second section, and the third section have different inclination angles.

2. The front aerodynamic structure according to claim 1, wherein a ratio of an outlet cross-sectional area of the airflow outlet to an inlet cross-sectional area of the airflow inlet ranges from 1:1 to 1:1.3.

3. The front aerodynamic structure according to claim 1, wherein the acceleration aerodynamic channel has a narrow portion located in the middle of the acceleration aerodynamic channel, and a ratio of an inlet cross-sectional area of the airflow inlet to a pipe cross-sectional area of the narrow portion ranges from 1:0.9 to 1:0.95.

4. The front aerodynamic structure according to claim 1, wherein, based on the ground plane on which the vehicle travels, the first section has an inclination angle ranging from 0 degrees to 6 degrees, the second section has an inclination angle ranging from 70 degrees to 90 degrees, and the third section has an inclination angle ranging from 10 degrees to 40 degrees.

5. The front aerodynamic structure according to claim 1, wherein the acceleration aerodynamic channel has a narrow portion located in the middle of the acceleration aerodynamic channel, and a ratio of an inlet cross-sectional area of the airflow inlet to a pipe cross-sectional area of the narrow portion ranges from 1:0.9 to 1:0.95.

6. The front aerodynamic structure according to claim 1, wherein the third section of the acceleration aerodynamic channel has an upper part and a lower part; wherein the upper part is disposed at the hood of the vehicle, and the upper part and the lower part are detachably assembled and matched to form the third section and the airflow outlet.

7. The front aerodynamic structure according to claim 1, wherein the vehicle is an electric vehicle.

\* \* \* \* \*